J. J. LANGER.
CABLE FASTENING.
APPLICATION FILED JAN. 14, 1921.
1,408,519.
Patented Mar. 7, 1922.
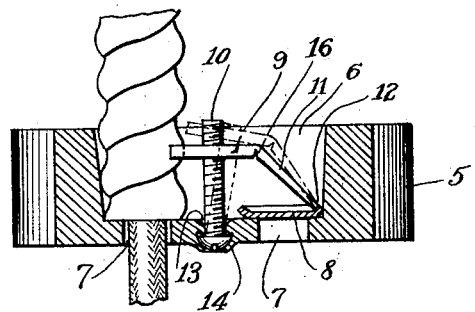
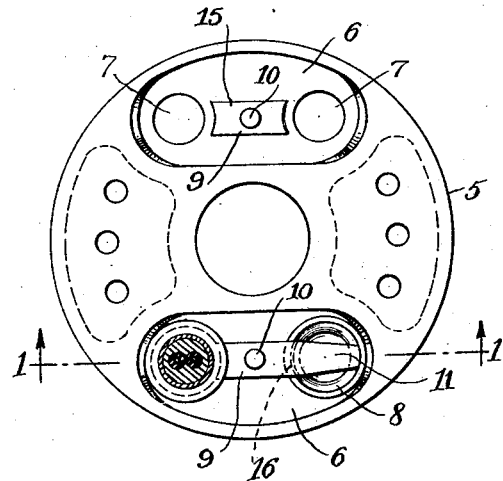
Inventor
Julius J Langer
By his Attorney
Philip S. McLean.

UNITED STATES PATENT OFFICE.

JULIUS J. LANGER, OF NEW YORK, N. Y., ASSIGNOR TO STANDARD FLEXIBLE CONDUIT CORPORATION, OF NEW YORK, N. Y., A CORPORATION OF NEW YORK.

CABLE FASTENING.

1,408,519. Specification of Letters Patent. Patented Mar. 7, 1922.

Application filed January 14, 1921. Serial No. 437,135.

*To all whom it may concern:*

Be it known that I, JULIUS J. LANGER, a citizen of the United States, and a resident of New York, county and State of New York, have invented certain new and useful Improvements in Cable Fastenings, of which the following is a specification.

My invention relates to fastenings for armored cable, flexible conduit and the like, and the objects of the invention are to provide a simple, practical and positive anchorage device for securing the ends of the armored cable or conduit and which, furthermore, can be operated from the front or exposed face of the support with which the cable or conduit is engaged.

In order that the invention may be fully understood and its several advantages appreciated, I have illustrated in the accompanying drawing a simple commercial embodiment of the same, but wish it understood that the structure may be modified more or less to meet different requirements, without departure from the true spirit of the invention, as will be apparent from the scope of the appended claims.

Figure 1 in the drawing referred to is a side elevation and part sectional view of the device used for securing the end of a section of armored cable, the sectional portion being taken on substantially the plane of line 1—1 of Figure 2.

Figure 2 is a rear view of the box or support, with the armored cable indicated in section.

The support or base 5 of the device in the present disclosure is in the nature of a ceiling fixture or outlet box cover having recesses 6 in the back thereof, each adapted to receive the ends of a pair of armored cables, conduits or the like. In the bottom of these recesses I have provided outlets 7 for the conductor wires, which outlets, when not in service, may be closed by suitable "knock-outs" or cover discs 8.

The ends of the cable or conduit are secured in these recesses by an anchorage in the form of a lever 9 engaged by a screw bolt 10 and having a forwardly and angularly extending portion 11 fulcrumed at 12 on the bottom of the recess.

The screw passes through an opening 13 in the front of the base, which opening is made sufficiently large or rounded at its edges, as indicated, to permit the screw to have a rocking motion while swinging the securing lever about its fulcrum.

To prevent this screw from dropping forward and thus carrying the end of the lever into position where it would block the entry of the cable, I have shown the base as having an integral lip 14 flanged over the head of the bolt.

When only a single cable end is to be secured, the device is used as indicated in Figure 1, that is, the cable is entered in the recess with the lever swung to the rear, as shown in dotted lines, after which the screw is turned to swing the lever forwardly and bring its end into clamping engagement with the cable armor. It will be evident that as the lever pivots on its fulcrum, the free end of the lever will be brought all the more firmly into engagement with the cable armor. If it becomes necessary at any time to release the cable, this can be easily done by turning the screw in a direction to swing the lever to the rear, the confining flange over the head of the screw forming an abutment during this operation to cause the lever to be positively shifted to the rear.

Where a pair of cables are to be secured, the fulcrum extension 11 of the lever is broken off to leave only a cross head such as I have indicated at 15, Figure 2, which will grip the adjoining sections of cable. To facilitate this breaking off of the fulcrum extension, the lever may be weakened at the point where it is intended it shall be broken, substantially as indicated at 16.

It will be evident that the leverage form of securing device herein disclosed operates in more positive and direct fashion than the "wedging" types of clamps heretofore proposed. The device has the further advantages of being quite simple and relatively inexpensive.

What I claim is:

1. In a fastening of the character described, a base having a cable or conduit receiving recess, a cable securing lever fulcrumed at one end on the base to swing in a plane longitudinally of the cable or conduit with its free end positioned to engage the cable or conduit inserted in the recess and a screw bolt engaged with said lever intermediate the fulcrum at one end and the cable engaging portion at the opposite end thereof for positively forcing said latter end into gripping engagement with the cable or conduit.

2. In a fastening of the character described, a base designed to receive the end portion of a cable or conduit, a securing lever fulcrumed at one end on said base and having its opposite end positioned to engage a cable or conduit engaged with the base and a screw bolt connected with an intermediate portion of said lever and operative both to swing the securing lever toward the cable or conduit and to back said lever away from said cable or conduit.

3. In a fastening of the character described, a base having a cable or conduit receiving recess at the back thereof, a securing lever fulcrumed to swing in a plane longitudinally of the cable or conduit and having its free end positioned to engage the cable or conduit inserted in the recess, during such swinging movement and a screw bolt engaged with said lever, said screw bolt having a rocking bearing in the base to allow for the swinging movements of the lever and provided with an operating head exposed at the front of the base.

4. In a fastening of the character described, a base having a cable or conduit receiving recess at the back thereof, a securing lever fulcrumed to swing in a plane longitudinally of the cable or conduit and having its free end positioned to engage the cable or conduit inserted in the recess, during such swinging movement and a screw bolt engaged with said lever, said screw bolt having a rocking bearing in the base to allow for the swinging movements of the lever and provided with an operating head exposed at the front of the base, said base having a portion overstanding said operating head to thereby confine the securing bolt in its bearing.

5. In a fastening of the character described, a base having a cable or conduit receiving recess at the back thereof, a securing lever fulcrumed to swing in a plane longitudinally of the cable or conduit and having its free end positioned to engage the cable or conduit inserted in the recess, during such swinging movement and a screw bolt engaged with said lever, said screw bolt having a rocking bearing in the base to allow for the swinging movements of the lever and provided with an operating head exposed at the front of the base, said lever having a removable portion at its fulcrum end.

6. In a fastening of the character described, a base having a cable or conduit receiving recess at the back thereof, a securing lever fulcrumed to swing in a plane longitudinally of the cable or conduit and having its free end positioned to engage the cable or conduit inserted in the recess, during such swinging movement and a screw bolt engaged with said lever, said screw bolt having a rocking bearing in the base to allow for the swinging movements of the lever and provided with an operating head exposed at the front of the base, the fulcrum end of the lever comprising an angularly projecting forwardly extending portion to fulcrum at the bottom portion of the recess.

7. In a fastening of the character described, a base having a seat for a cable or conduit, a securing lever fulcrumed on the base to swing in a plane longitudinally of the cable or conduit and having its free end positioned to engage a cable or conduit engaged with such seat and a screw bolt connected with the lever and having an exposed operating head, the base having a portion overstanding said operating head to thereby confine the bolt to the base.

8. In a fastening of the character described, a base having a seat for a cable or conduit, a securing lever fulcrumed on the base to swing in a plane longitudinally of the cable or conduit and having its free end positioned to engage a cable or conduit engaged with such seat and a screw bolt connected with the lever and having an exposed operating head, the lever having a portion at its fulcrum end readily removable for the purpose of shortening the same.

In witness whereof, I have hereunto set my hand this 30th day of December, 1920.

JULIUS J. LANGER.